United States Patent [19]

Ziegler

[11] Patent Number: 4,582,474
[45] Date of Patent: Apr. 15, 1986

[54] IN-MOLD LABEL DISPENSER OF BLOW MOLDING MACHINE

[75] Inventor: William E. Ziegler, Tecumseh, Mich.

[73] Assignee: Plastipak Packaging, Inc., Plymouth, Mich.

[21] Appl. No.: 718,863

[22] Filed: Apr. 2, 1985

[51] Int. Cl.⁴ .................. B29C 5/06; B29C 27/14; B29C 17/07; B65H 3/08
[52] U.S. Cl. .................. 425/503; 425/504; 425/522; 425/539
[58] Field of Search .............. 425/503, 504, 522, 539, 425/126 R

[56] References Cited

U.S. PATENT DOCUMENTS

| 3,292,209 | 12/1966 | Borkmann. | |
|---|---|---|---|
| 3,324,508 | 6/1967 | Dickinson. | |
| 4,355,967 | 10/1982 | Hellmer. | |
| 4,359,314 | 11/1982 | Hellmer. | |
| 4,397,625 | 8/1983 | Hellmer et al.. | |
| 4,479,644 | 10/1984 | Bartimes et al.. | |
| 4,479,770 | 10/1984 | Slat et al.. | |
| 4,479,771 | 10/1984 | Slat et al. | 425/503 |
| 4,498,854 | 2/1985 | Ross | 425/522 X |
| 4,501,548 | 2/1985 | Jahnel | 425/504 X |
| 4,549,863 | 10/1985 | Bourgeois | 425/503 X |

Primary Examiner—J. Howard Flint, Jr.
Attorney, Agent, or Firm—Brooks & Kushman

[57] ABSTRACT

An in-mold label dispenser (20) for a plastic blow molding machine of the rotary wheel type is disclosed as including a base (50) on which a carrier arm (52) is pivotally mounted by a support (58) to swing a dispensing head (60) on the carrier arm along a curved path between withdrawn and inserted positions with respect to mold sections (32) of an adjacent open mold (28) on the machine wheel (24). At least one label carrier (62) is mounted on the dispensing head for movement between retracted and extended positions, and at least one label magazine (64) is located adjacent the dispensing head with the carrier arm in the withdrawn position. A drive mechanism (66) of the label dispenser (20) includes a first drive (68) that pivotally moves the carrier arm and also includes a second drive (70) that moves each label carrier between the retracted and extended positions during cyclical operation that transfers labels from the label magazine to the molds on the machine wheel. Any number of label carriers can be utilized depending upon the number of labels supplied to each mold and the number of cavities in each mold. First and second drive units (86 and 92) of the first and second drives (68 and 70) are driven by a common input 72 of the drive mechanism 66 and have solid mechanical drives that provide the coordinated carrier arm pivoting and label carrier movement without the need of any location sensor to control the movements.

25 Claims, 16 Drawing Figures

IN-MOLD LABEL DISPENSER OF BLOW MOLDING MACHINE

TECHNICAL FIELD

This invention relates to an in-mold label dispenser for a plastic blow molding machine.

BACKGROUND ART

Blow molding machines conventionally provide a tube of hot plastic between open sections of a mold. Closing of the mold then clamps the hot plastic tube and allows air to be blown into the tube such that it assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem is that such paper labels can become wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded plastic parts. This in-mold labeling is performed by initially inserting a label within the mold prior to the introduction of the hot plastic tube and by subsequently closing sections of the mold in preparation for the blowing operation. The subsequent blowing operation forms the hot plastic tube around the label to the shape of the mold and activates a heat sensitive adhesive that provides a permanent bond which is incapable of being broken by moisture or otherwise. Also, such in-mold labeling provides smooth transition between the label and the adjacent surface of the molded plastic part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated beverages, it is believed that in-mold labeling may reduce the flow of carbon dioxide out through the container wall over a period of time and thereby increases the shelf life.

Prior in-mold label dispensers for blow molding machines conventionally include a label carrier having vacuum cups that receive a label from a label magazine and then are movable to deposit the label within the mold cavity whereupon termination of a vacuum drawn at the suction cups allows a vacuum drawn at the mold cavity to secure the label in position in preparation for the molding. Such vacuum carriers have previously been mounted on linkages that move the labels in an angular path with respect to the direction of opening and closing movement of mold sections of the mold in order to permit depositing of the labels in the confined space permitted by the extent of the mold opening. With the linkage type of label carrier, only one label can be deposited within the mold at a given time since movement thereof on the linkage toward one mold section interfers with movement of a similar linkage toward an opposed mold section for depositing another label.

Another prior art type of in-mold label dispenser is disclosed by U.S. Pat. No. 4,359,314 and includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit more than one label in the mold at a given time due to the limited space present upon opening of the mold.

With both of the above prior art type of in-mold label dispensers, the cycle time of the blow molding machine is increased due to the necessity of depositing labels sequentially rather than at the same time when more than one label is to be applied to each mold.

U.S. Pat. Nos. 3,292,209 and 4,397,625 each disclose an in-mold label dispenser wherein fluid motors are utilized to both: (1) move a label dispensing head to between open mold sections of a mold; and (2) extend label carriers to deposit the labels on the mold sections prior to retracting the label carriers and thereafter withdrawing the dispensing head in preparation for mold closing and blowing of the plastic article within the mold. With such dispensers, the use of fluid motors makes it difficult to accurately position the labels within the mold due to the tolerances involved with the dispensing head and label carrier movements.

U.S. Pat. No. 3,324,508 discloses an in-mold label dispenser wherein a linkage moves labels from rolls of labels to a mold where the labels are held by an electrostatic charge prior to the blow molding operation.

U.S. Pat. Nos. 4,479,770 and 4,479,771 of William A. Slat, et al disclose in-mold label dispensers wherein a first solid mechanical drive moves a dispensing head between inserted and withdrawn positions with respect to an open mold and wherein a second solid mechanical drive extends and retracts label carriers in order to perform the labeling operation. Use of such solid mechanical drives to move the dispensing head and the label carriers permits accurate positioning of the labels. The ability to accurately position the labels is extremely important, especially when utilized with a plastic blow molding machine of the rotary wheel type wherein the molds are mounted for opening and closing movement on a wheel that rotates. The speed at which the wheel rotates is sufficiently fast to require close tolerances in the label timing and positioning.

DISCLOSURE OF INVENTION

An object of the present invention is to provide an improved in-mold label dispenser for a plastic blow molding machine including a rotary wheel having molds that include mold sections movable between open and closed positions during a blow molding operation. The in-mold label dispenser includes a base of any suitable construction and also includes a carrier arm that has first and second ends and preferably has a tubular construction. A support of the dispenser pivotally mounts the first end of the carrier arm on the base for movement of the carrier arm about a pivotal axis between withdrawn and inserted positions with respect to mold sections of an adjacent open mold. A dispensing head is fixedly mounted on the second end of the carrier arm for swinging movement along a curved path and is located between open mold sections with the carrier arm in the inserted position. At least one label carrier of the dispenser is mounted on the dispensing head for movement between retracted and extended positions. At least one label carrier is located adjacent the dispensing head with the carrier arm in the withdrawn position in order to supply labels to the dispensing head. A drive mechanism of the dispenser includes a first drive that pivotally moves the carrier arm between the withdrawn and inserted positions and a second drive that moves the label carrier between the retracted and extended positions during cyclical operation that transfers labels from the label magazine to the mold.

In the preferred construction of the in-mold label dispenser, the drive mechanism includes an input that is driven in coordination with the rotary wheel of the blow molding machine with which the label dispenser is used. The input of the drive mechanism provides driving of the first and second drives thereof in coordination with the rotary wheel and with each other in order to control the pivotal movement of the carrier arm with the extending and retracting movement of the label carrier.

A detachable connection is also preferably incorporated in the in-mold label dispenser for detachably securing the carrier arm to the support. Such a detachable connection allows a carrier arm with a dispensing head having the appropriate number of label carriers to be utilized. In most cases, there will normally be the same number of label magazines as there are label carriers in order to supply labels to each label carrier with the carrier arm in the withdrawn position.

An adjuster of the label dispenser controls the extent of movement of the label carrier between the retracted and extended positions in order to insure that labels will be received with the carrier arm in the withdrawn position and supplied to the mold with the carrier arm in the inserted position.

The support for the carrier arm preferably provides pivotal movement thereof about a horizontal axis between the inserted and the withdrawn positions. This horizontal axis extends perpendicular to a plane between the open mold sections of the mold and the carrier arm movement is along this plane to facilitate the movement to and from the inserted position.

The carrier arm support preferably is embodied by a horizontally extending support tube that extends along the horizontal axis about which the carrier arm pivots. The first end of the support tube is rotatably mounted on the base of the label dispenser about the horizontal axis. A second end of the support tube supports the carrier arm for the pivotal movement between the withdrawn and inserted positions. The carrier arm is preferably secured to the support tube by the detachable connection previously mentioned in order to permit use of a carrier arm with a dispensing head having the required number of label carriers.

In the preferred construction of the drive mechanism, the first drive includes a first drive unit that is mounted on the base and has an input for providing driving thereof as well as having an output that supports the first end of the support tube. The second drive has a second drive unit mounted on the base and has an input as well as an output that extends through the support tube to move the label carrier on the dispensing head on the carrier arm. The drive mechanism also has an input that drives the inputs of both the first and second drive units in coordination with each other and with the rotary wheel of the blow molding machine with which the label dispenser is used. Such driving of the first and second drives coordinates the label carrier and carrier arm movements with the wheel rotation to provide accurate positioning of the labels in the molds. The input of the drive mechanism preferably includes a pair of pulleys and a continuous belt that interconnect the inputs of the first and second drive units. An adjustable tensioner controls the tension of the belt to insure the coordinated driving of the first and second drive units of the first and second drives by the drive mechanism input.

In its preferred construction, the second drive unit comprises a plunger that extends through the support tube and is moved axially along the horizontal axis about which the support tube is rotated by the first drive unit. The second drive unit also includes a cam and follower that connect the plunger and the label carrier to provide movement thereof between the retracted and extended positions by axially movement of the plunger within the support tube. The cam is most preferably mounted on the plunger, and the carrier arm includes a rotatable connector that moves the label carrier between the retracted and extended positions. The follower is mounted on the rotatable connector and is engaged with the cam on the plunger to move the label carrier by the plunger movement within the support tube. Preferably, the cam includes a pair of spaced flanges between which the follower is received in order to permit movement of the follower by the cam with the carrier arm in either the withdrawn or inserted position.

The second drive unit of the drive mechanism preferably includes an adjuster that controls the extent of axial movement of the plunger to thereby control the extent of movement of the label carrier between the retracted and extended positions. This adjuster preferably includes an eccentric that is rotated by the second drive unit and connected to the plunger to provide the axial movement of the plunger. In addition, the adjuster includes at least one adjustment member for controlling the eccentricity of the eccentric and the extent of axial movement of the plunger. Two threaded adjustment members are utilized in the preferred construction located on opposite sides of the eccentric.

An adjustable mount is also preferably incorporated in the in-mold label dispenser to adjustably position the first and second drive units of the drive mechanism and hence the support tube and the carrier arm on the base. This adjustable mount includes a plate that supports the first and second drive units and also includes vertically adjustable connections that secure the plate to the base to permit vertical ajdustment of the dispensing head of the carrier arm and hence the vertical location at which the labels are supplied to the molds. An adjusting bolt is also preferably utilized to move the plate vertically on the base to provide the adjustment of the vertical location at which the labels are supplied to the molds.

In certain applications, a single label carrier may be utilized to apply a single label to the mold. Many plastic blow molded containers include a pair of labels and, in such case, a pair of the label carriers are provided on the dispensing head. As disclosed, the movement of the label carriers is in opposite direction so as to provide application of the labels to both mold sections for location thereof on opposite sides of the blow molded article. Furthermore, modifications of the carrier arm and dispensing head are also disclosed for providing two and three pairs of the label carriers for applying labels to molds having multiple cavities. Likewise, it is also possible to provide a greater number of labels as may be required for the particular in-mold labeling to be performed, and it is also possible to provide a single label to each cavity of a multiple mold cavity.

Each of the embodiments of the dispensing head with a plurality of label carriers preferablyu has a carrier arm including a rotatable connector that is rotated by the second drive and connected to one of the label carriers. Rotation of the connector by the second drive provides movement of the one label carrier between the retracted and extended positions to perform the in-mold labeling operation. A drivetrain connects the one label carrier with each other label carrier of the dispensing head to provide the retracting and extending movement of the other label carriers upon rotation of the connector by the second drive of the drive mechanism. In each of these embodiments, the carrier arm comprises a tubular arm member through which the rotatable connector extends. Opposite ends of the tubular arm member include antifriction bearings that support the connector for rotation that moves the label carriers between the retracted and extended positions. In the carrier arm embodiments wherein the dispensing head has a plurality of pairs of label carriers, the drivetrain that connects the label carriers includes gears and lost motion camming connections for moving the label carriers between the retracted and extended positions by the rotation of the connector supported by the antifriction bearings on the tubular carrier arm.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
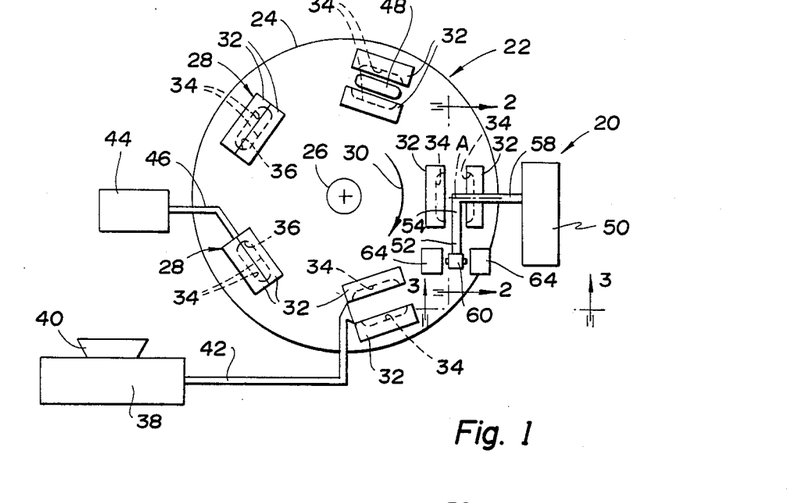
FIG. 1 is a schematic top plan view of a rotary wheel type plastic blow molding machine and an in-mold label dispenser that is utilized therewith and constructed in accordance with the present invention.

With reference to FIG. 1 of the drawings, an in-mold label dispenser constructed in accordance with the present invention is schematically illustrated and identified by reference numeral 20. In-mold label dispenser 20 is utilized with a plastic blow molding machine 22 that includes a rotary wheel 24 mounted for rotation about a shaft 26 that preferably extends in a vertical direction. Rotary wheel 24 includes molds 28 mounted on its periphery for movement in a clockwise direction as illustrated by arrow 30. Each mold 28 includes a pair of mold sections 32 that are mounted as illustrated schematically by 33 in FIG. 3 on the wheel 24 for radial movement relative to the wheel shaft 26 between open and closed positions with respect to each other as shown in FIG. 1. Mold sections 32 each include a cavity section 34 that cooperates with the cavity section of the associated mold section to define an enclosed cavity 36 in the closed position of the mold. Downstream from the in-mold label dispenser 20, the blow molding machine 22 includes an extruder 38 whose input receives raw plastic from a hopper 40 and whose output 42 feeds an extruded plastic tube to the adjacent open mold 28 which has previously had one or more labels supplied to its cavity sections 34 by the label dispenser 20. Rotation of the wheel 24 and closing of the mold with the extruded plastic tube received within the cavity is then followed by a blowing operation during which a source of compressed gas 44 feeds a conduit 46 that is communicated with the interior of the extruded plastic tube within the mold cavity 36. Outward blowing of the extruded plastic tube then provides securement thereof with each label within the mold cavity 36 to provide the in-mold labeling operation. During continued rotation of the machine wheel 24, cooling takes place prior to opening of the mold 28 to permit ejection of the labeled blow molded article 48. The open mold is then moved by subsequent rotation of wheel 24 to the in-mold label dispenser 20 in preparation for another cycle of the in-mold labeling operation.

Figure 2:
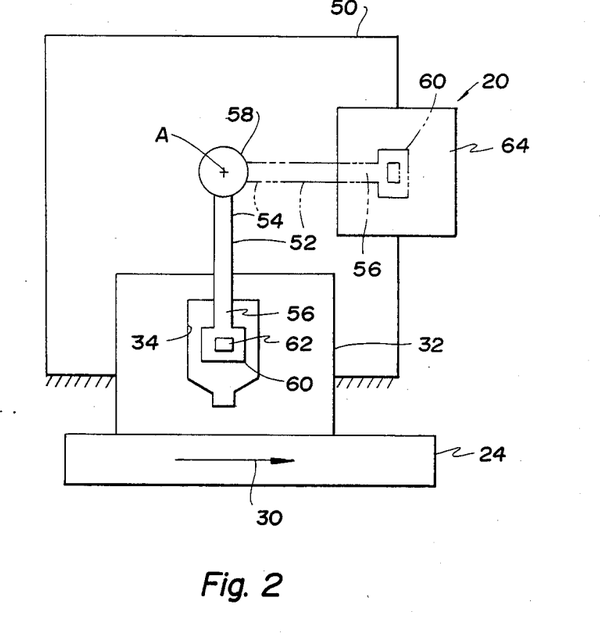
FIG. 2 is a schematic elevation view of the in-mold label dispenser taken along the direction of line 2—2 in FIG. 1.

With combined reference to FIGS. 1 and 2, the in-mold label dispenser includes a base 50 and a carrier arm 52 that has first and second ends 54 and 56. A support 58 pivotally mounts the first end 54 of the carrier arm 52 on the base 50 for movement about a pivotal axis A between withdrawn and inserted positions with respect to mold sections 32 of an adjacent open mold 28. A dispensing head 60 is fixedly mounted on the second end 56 of the carrier arm 52 for swinging movement along a curved path and is located between the open mold sections 32 of the adjacent mold with the carrier arm in the inserted position. A pair of label carriers 62 are mounted on the dispensing head 60 for movement between the retracted and extended positions respectively shown by solid and phantom line representation in FIG. 3. However, it should be understood that it is possible to practice the invention with a single label carrier if only one label is to be applied to the blow molded article or with a greater number of label carriers when utilized with a multiple cavity mold as is hereinafter more fully described. A pair of label magazines 64 are located adjacent the dispensing head 60 as illustrated in FIG. 1 with the carrier arm 52 in the withdrawn position, it being understood that only a single label magazine would be necessary if only one label carrier is to be utilized.

Figure 3:
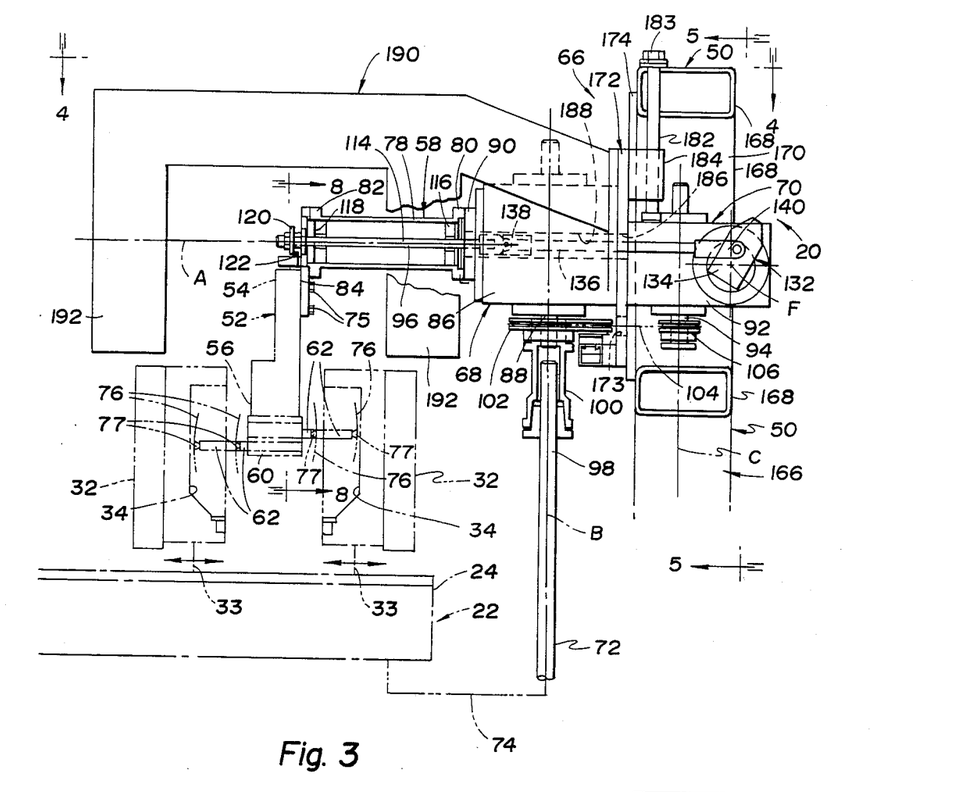
FIG. 3 is an elevation view of the in-mold label dispenser as shown by solid line representation and is taken along the direction of line 3—3 in FIG. 1 with a rotary wheel of the blow molding machine and one mold thereof illustrated by phantom line representation.

As best illustrated in FIG. 3, the in-mold label dispenser 20 includes a drive mechanism 66 having a first drive 68 that moves the carrier arm 52 between the withdrawn and inserted positions. Drive mechanism 66 also includes a second drive 70 that moves the label carriers 62 between the retracted and extended positions. As is hereinafter described, the first and second drives 68 and 70 of drive mechanism 66 are driven in a coordinated manner during cyclical operation that transfers labels from the label magazines 64 to the molds 28. Both the first and second drives 68 and 70 of the drive mechanism 66 are embodied by solid mechanical drive, as opposed to fluid operated cylinders which require sensors to determine the extent of travel, and thereby are capable of providing the pivoting of the carrier arm 52 and the extension and retraction of the label carriers 62 in coordination with each other without any location sensors for sensing the extent of travel. Also, as is hereinafter more fully described, the drive mechanism 66 includes an input 72 which is illustrated in FIG. 3 and schematically shown as having a connection 74 with the rotary wheel 24 of the blow molding machine 22. The drive mechanism input 72 drives both the first and second solid mechanical drives 68 and 70 of the drive mechanism 66 in coordination with each other and with the rotation of the wheel 24 to insure accurate location of the placement of the labels within each mold 28.

Figure 9:
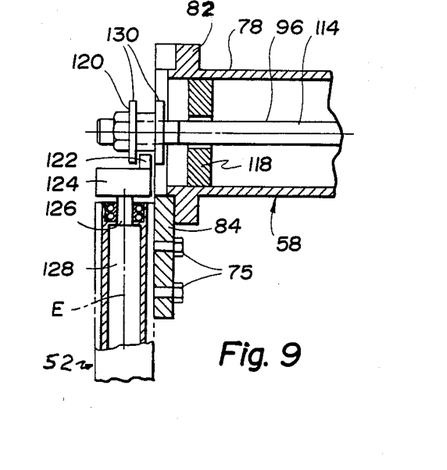
FIG. 9 is a partial sectional view taken along the direction of line 9—9 in FIG. 8 and illustrating a cam and follower that actuate label carrier movement during operation of the in-mold label dispenser.

As illustrated in FIGS. 3 and 9, the in-mold label dispenser 20 includes bolts 75 that provides a detachable connection for detachably securing the carrier arm 52 to the support 58. This detachable connection allows the carrier arm 52 to be rmeoved and replaced by a carrier arm with a dispensing head having a different number of label carriers. For example, a carrier arm with a dispensing head having a single label carrier could be utilized. Furthermore, if each mold is of the multiple cavity type, one or more labels can be supplied to each cavity by a carrier arm having a dispensing head with the appropriate number of label carriers. For example, the carrier arm 52' illustrated in FIGS. 11 through 13 has a dispensing head 60' with two pairs of label carriers and can be secured to the support by the detachable connection provided by the bolts. Likewise, the carrier arm 52" illustrated in FIGS. 14 through 16 has a dispensing head 60" with three pairs of label carriers and likewise can be secured to the support by the detachable bolt connection. A more complete description of each carrier arm and dispensing head embodiment is hereinafter provided.

As illustrated in FIGS. 1 through 4, the support 58 is oriented such that the pivotal axis A of the carrier arm extends horizontally. Carrier arm 52 is thus pivotally moved by the drive mechanism about the horizontal axis A between the inserted and withdrawn positions best illustrated in FIGS. 1 and 2. This pivotal movement of the carrier arm 52 moves the dispensing head 60 along a vertical plane that is perpendicular to the radial direction along which the mold sections 32 move between the open and closed positions on the rotary wheel 24 of the blow molding machine 22.

A cycle of operation of the in-mold label dispenser 20 begins with the first drive of the drive mechanism positioning the carrier arm 52 in the phantom line position of FIG. 2 so that the dispensing head 60 is located between the pair of label magazines 64 which are of a conventional construction with each including a single stack of labels 76. Operation of the second drive of the drive mechanism then moves the label carriers 62 from the retracted positions to the extended positions. In the extended positions, suction cups 77 on the ends of the label carriers 62 are respectively engaged with the exposed label of a single stack of labels of the associated label carrier 64 such that a vacuum drawn at the suction cups through suitable unshown flexible conduits of a conventional type secures the labels to the associated label carriers. The second drive of the drive mechanism then moves the label carriers 62 back to the retracted position and the first drive pivotally moves the carrier arm from the phantom line indicated withdrawn position of FIG. 2 to the solid line indicated inserted position between the mold sections 32 of the open mold 28 adjacent the in-mold label dispenser. The second drive of the drive mechanism then moves the retracted label carriers to the extended position such that the labels 76 are positioned proximate the cavity sections 34 of the mold sections 32 as illustrated by phantom line representation in FIG. 3 whereupon the vacuum of cups 77 is terminated and a vacuum is drawn through suitable vacuum ports in the cavity sections to secure the labels to the mold sections in preparation for the blow molding previously described. Retracting movement of the label carriers 62 under the operation of the second drive of the drive mechanism and movement of the carrier arm 52 from the inserted position to the withdrawn position then completes the in-mold labeling operation and readys the label dispenser 20 for the next cycle.

As best illustrated in FIG. 3, the carrier arm support 58 includes a horizontally extending support tube 78 that extends along the horizontal axis A with this axis colinear with the central axis of the support tube. A first end 80 of the support tube 78 is rotatably mounted on the base 50 about the horizontal axis A in a manner which is hereinafter more fully described. The support tube 78 also has a second end 82 having a support plate 84 suitably fixed thereto in any suitable manner. Support plate 84 of the second support tube end 82 is secured to the carrier arm 52 by the detachable connection bolts 75 to support the carrier arm for the pivotal movement between the withdrawn and inserted positions upon rotation of the support tube 78.

Figure 4:
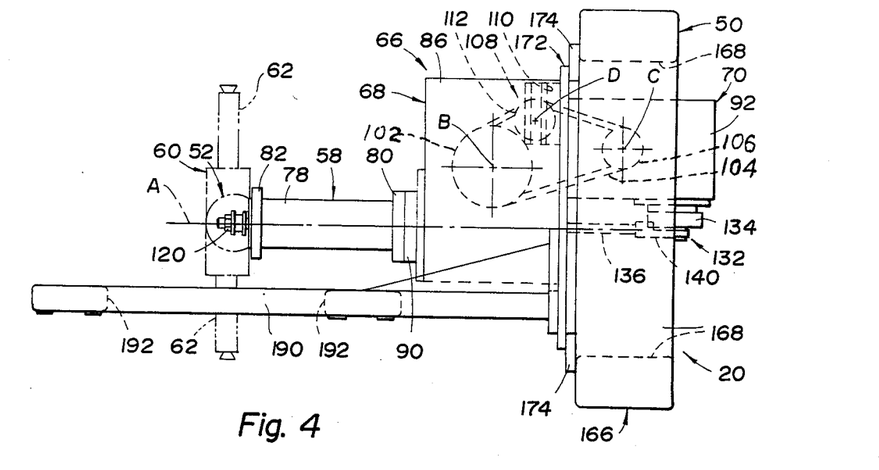
FIG. 4 is a top plan view of the in-mold label dispenser taken along the direction of line 4—4 in FIG. 3.

With reference to FIGS. 3 and 4, the first drive 68 includes a first drive unit 86 that is mounted on the base 50 in a manner which is hereinafter more fully described. Drive unit 86 has a rotatable input 88 that rotates about a vertical axis B and also has a rotatable output 90 that supports the first end 80 of the support tube 78 for rotation about the horizontal axis A. The second drive 70 includes a second drive unit 92 that is also mounted on the base 50 in a manner which is hereinafter described and has a rotatable input 94 that rotates about a vertical axis C as well as having an output 96. As will be described later, the output 96 extends through the support tube 78 and is movable axially to move the label carriers 62 on the dispensing head 60 on carrier arm 52. Both the first and second drive units 86 and 92 include gearing and/or camming that provide solid mechanical connections between the inputs and outputs so as to provide the carrier arm pivotiing and label carrier movement without requiring any location sensors to control such movement.

As can be seen by reference to FIG. 3, the input 72 of the drive mechanism 66 is embodied by a shaft 98 that is rotatably driven about axis B by the connection 74 to the blow molding machine wheel 24. A coupling 100 connects the input shaft 98 to the input 88 of the first drive unit 86 of the first drive 68. A pulley 102 is fixed to the coupling 100 to rotate therewith upon rotation of the input shaft 98 about axis B. A continuous belt 104 is received by the pulley 102 and is also received by a pulley 106 that is fixed to the rotatable input 94 of the second drive unit 92 of the second drive 70 for rotation about axis C. The pair of pulleys 102 and 106 and the continuous belt 104 thus cooperate to provide driving of the inputs 88 and 94 of the first and second drive units 86 and 92 in coordination with each other and with the rotary wheel 24 of the blow molding machine 22 with which the in-mold label dispenser 20 is utilized.

With reference to FIG. 4, the drive mechanism 66 also includes an adjustable tensioner 108 for controlling the tension of the belt 104 that interconnects the pulleys 102 and 106. The adjustable tensioner 108 includes a track 110 mounted on the base 50 and an idler pulley 112 that is adjustably positioned along the track 110. A suitable retainer secures the idler pulley 112 in any adjusted position to provide the proper tensioning of the continuous belt 104 in order to secure the solid mechanical interconnection of the drive mechanism input 72 with the inputs 88 and 94 of the first and second drive units 86 and 92, respectively.

As best illustrated in FIG. 3, the output 96 of the second drive unit 86 comprises a plunger 114 that extends through the support tube 78 and is supported for axial movement along the horizontal axis A by a pair of bearings 116 and 118 respectively located adjacent the first and second support tube ends 80 and 82. A cam 120 and a follower 122 connect the plunger 114 and the label carriers 62 to provide the label carrier movement between the retracted and extended positions by the axial movement of the plunger within the support tube under the driving operation of the second drive unit 92 of the second drive 70.

Figure 8:
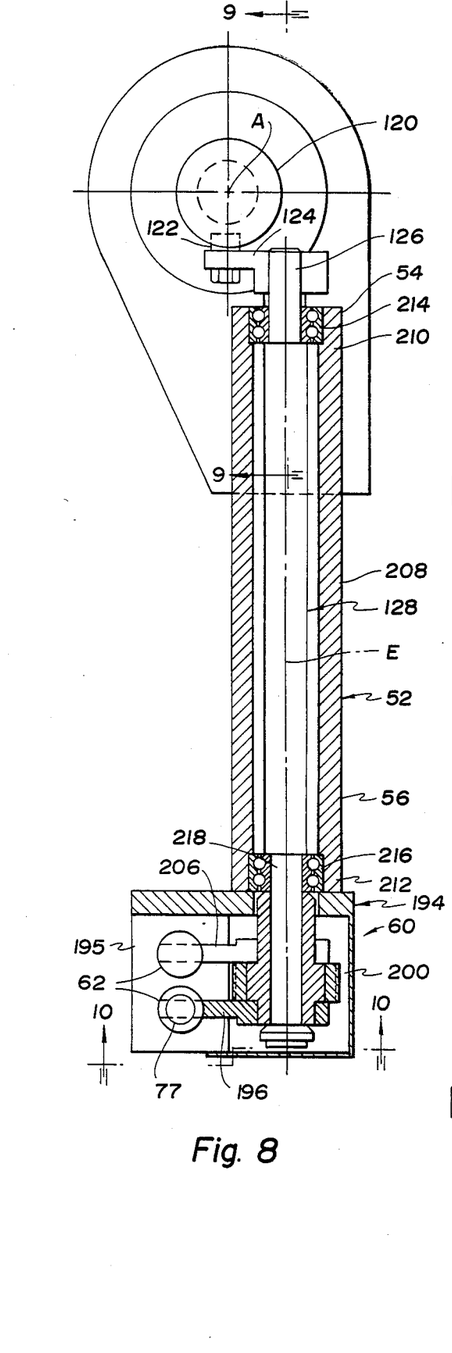
FIG. 8 is an enlarged sectional view taken through a carrier arm and a dispensing head of the in-mold label dispenser along the direction of line 8—8 in FIG. 3.

As can be best seen by combined reference to FIGS. 8 and 9, the cam 120 is mounted on the end of the plunger 114 and is secured in any suitable manner such as by a set screw. The follower 122 is mounted by a follower arm 124 on the upper end 126 of a rotatable connector 128 of the carrier arm 52. As is hereinafter more fully described, rotation of the connector 128 about an axis E moves the label carriers 62 between the retracted and extended positions. Engagement of the follower 122 by the cam 120 rotates the follower arm 124 and hence the rotatable connector 128 upon axial movement of the plunger 114 with the carrier arm in either the inserted or withdrawn positions with respect to the adjacent open mold as previously described. Cam 120 has a spool-like construction through which the plunger 114 extends and includes a pair of spaced flanges 130 (FIG. 9) between which the follower 122 is received. Thus, the follower 122 moves to a different rotational position about the horizontal axis A as the carrier arm 52 is rotated between the withdrawn and inserted positions with respect to the adjacent open mold. In either the withdrawn or inserted position, the axial movement of plunger 114 along axis A engages one of the cam flanges 130 with the follower 122 to provide the rotation of the connector 128 that moves the label carriers between the retracted and extended positions.

Figure 6:
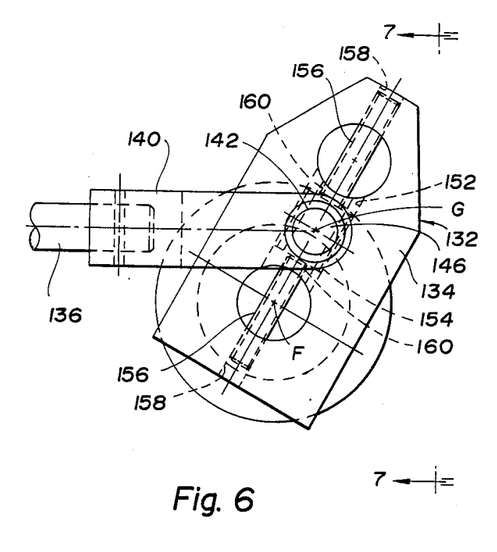
FIG. 6 is an enlarged view of an adjuster that is also illustrated in FIG. 3 and which controls extending and retracting label carrier movement of label carriers of the in-mold label dispenser.
Figure 7:
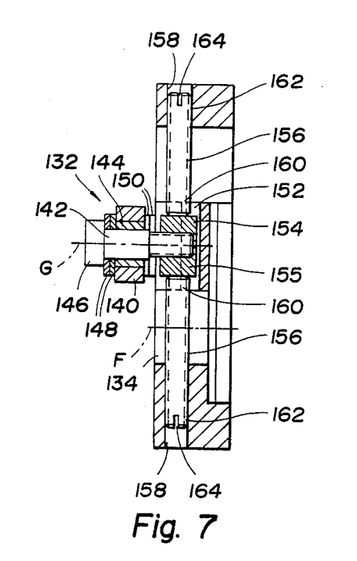
FIG. 7 is another view of the adjuster taken along the direction of line 7—7 of FIG. 6.

With reference to FIGS. 3, 6, and 7, the second drive unit 92 includes an adjuster 132 that controls the extent of axial movement of the plunger 114 to thereby control the extent of movement of the label carriers between the retracted and extended positions as previously described. Adjuster 132 includes an eccentric 134 that is rotated by the second drive unit 92 about an axis F by the driving operation of the second drive 70. A rod 136 has a first end connected by a universal joint 138 to the plunger 114 as shown in FIG. 3 and has a second end pivotally secured by a fitting 140 to the eccentric 134 at an axis G as shown in FIG. 6.

As illustrated in FIG. 7, a connector pin 142 extends through a bushing 144 in a hole through the end of the fitting 14 and has a head 146 that engages washers 148 on one side of the fitting. Washers 150 through which the pin 142 also extends are located between the fitting 140 and the eccentric 134 and engage the eccentric on opposite sides of an elongated slot 152 in which a slide 154 is received. A threaded shank 155 of pin 142 is received within a threaded hole in the slide 154. The width of the slot 152 is such that the slide 154 cannot move laterally with respect to the length of the slot which extends along a radial direction with respect to axis F. However, the slot 152 has a length along which the slide 154 can be adjusted to thereby provide adjustment of the eccentricity and the consequent extent of movement of rod 136 during any given rotation of the eccentric 134. As is apparent, the adjustment of the rod movement adjusts the length of the plunger movement and thereby adjusts the extent of extending and retracting movement of the label carriers. A pair of threaded adjustment members 156 are respectively received within threaded holes 158 in the eccentric 134 and have inner ends 160 that engage the slide 154 on opposite sides of the axis G. Outer ends 162 of the adjustment members 156 include associated screwdriver slots 164 to permit adjustment thereof that positions the slide 154 at the appropriate position along the length of the slot 152 to provide the proper extent of eccentricity and hence the correct amount of retracting and extending label carrier movement.

Figure 5:
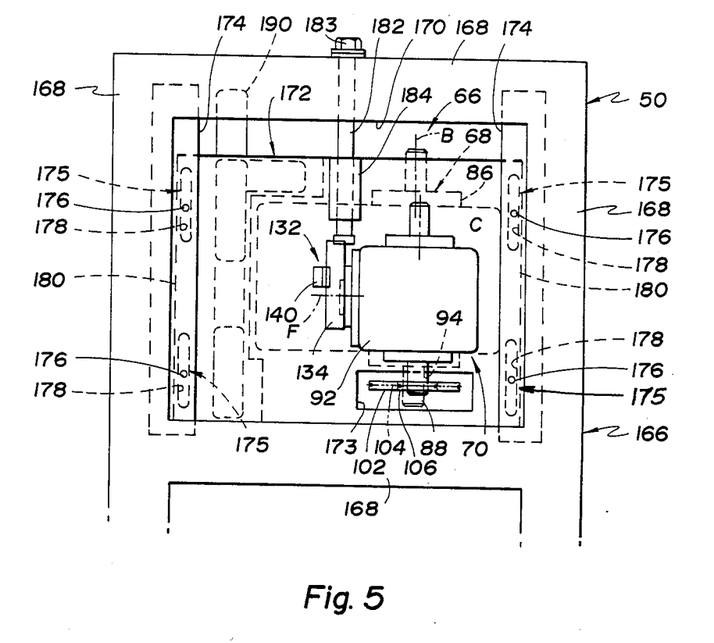
FIG. 5 is an elevation view of the in-mold label dispenser taken along the direction of line 5—5 in FIG. 3 and illustrates an adjustable mount for a drive mechanism of the label dispenser.

As illustrated in FIGS. 3, 4, and 5, the base 50 of the in-mold label dispenser 20 includes a framework 166 that is mounted on the factory floor and is made of tubular frame members 168 that cooperatively define an upper opening 170. A plate 172 is located in alignment with the opening 170 and is located on the side of the framework 166 toward the blow molding machine 22 as best illustrated in FIG. 3. The first drive unit 86 of the first drive 68 is secured in a suitable manner to the side of the plate 172 that faces the blow molding machine 22, while the second drive unit 92 of the second drive 70 is suitably secured to the other side of the plate within the opening 170 defined by the frame members 168 of the framework 166. An opening 173 in plate 172 is provided as shown in FIG. 5 to permit the pulley belt 104 to extend therethrough between the opposite sides of the plate in order to interconnect the first and second drive units 86 and 92. A pair of vertically elongated plate like mounts 174 are secured in a suitable manner to the framework 166 at the opposite sides of the opening 170 as also shown in FIG. 5 on the side of the framework at which the plate 172 is located.

Vertically adjustable connections 175 illustrated in FIG. 5 secure the plate 172 to the mounts 174 and hence to the framework 166. Each connection 175 includes a threaded stud 176 that is received within an associated vertical slot 178 in the adjacent edge 180 of plate 172. The stud of each connection 175 receives an unshown nut that is tightened to secure the connection after the vertical adjustment.

An adjusting bolt 182 shown in FIGS. 3 and 5 has a head 183 supported by the upper frame member 168 of the framework 166. Adjustment bolt 182 extends downwardly to a threaded hole within a connection lug 184 on the plate 172 and is rotatable to permit vertical adjustment of the plate with the connections 175 loosened. After the vertical adjustment to the correct height by rotation of the adjusting bolt 182, the connections 175 are tightened to secure the plate 172 at the correct elevation. It will be noted that the rod 136 driven by the second drive unit 92 extends through an opening 186 in the plate 172 (FIG. 3) and through an opening 188 in the first drive unit 86 for connection by the universal joint 138 to the plunger 114 as previously described.

As best illustrated in FIGS. 3 and 4, the plate 172 also supports a magazine holder 190 that extends in a cantilever fashion horizontally therefrom and has a pair of downwardly extending legs 192 on which suitable adjustable supports are provided to adjustably position label magazines from which the label carriers 62 receive the labels during the in-mold labeling operation.

Figure 10:
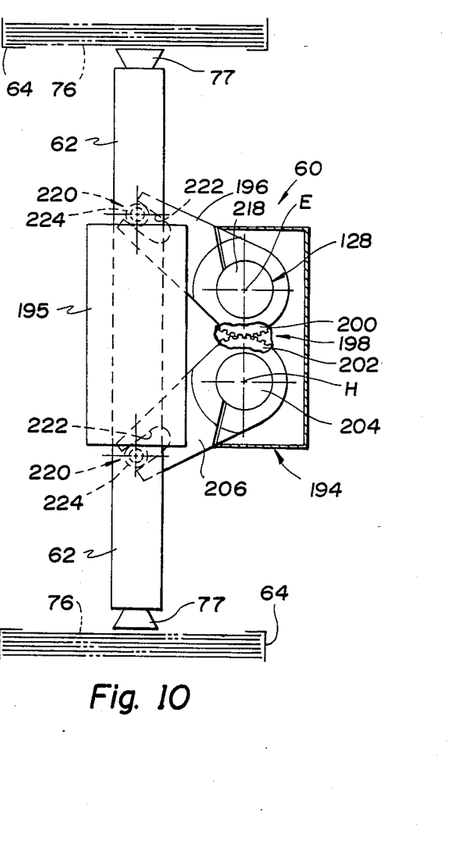
FIG. 10 is a bottom plan view taken partially in section along line 10—10 of FIG. 8 through a dispensing head of the in-mold label dispenser to illustrate label carriers that transfer labels during the in-mold labeling operation.

With reference to FIGS. 8 and 10, the dispensing head 60 includes a housing 194 on which the label carriers 62 are mounted within a suitable slideways in a slideway member 195 of the housing for rectilinear movement between the retracted and extended positions previously described. As also previously mentioned, the carrier arm 52 includes the rotatable connector 128 that is rotated about axis E by the second drive of the drive mechanism. This rotatable connector 128 is connected by a camming arm 196 to one of the label carriers 62 to provide the movement thereof between the retracted and extended positions by the connector rotation. A drivetrain 198 (FIG. 10) within the dispensing head housing 194 connects the rotatable connector 128 and hence the one label carrier 62 driven thereby through the camming arm 196 with the other label carrier 62 to provide coordination in the movement of the two label carriers between the retracted and extended positions. Drivetrain 198 includes a gear 200 that is rotatively driven with the rotatable connector 128 and meshed with a gear 202 that is rotatably driven on a shaft 204 about an axis H. The shaft 204 is supported by suitable bearings for rotation on the dispenser housing 194 and is rotatably fixed to a camming arm 206 that moves the other label carrier 62 in coordination with the label carrier driven by the camming arm 196.

As illustrated in FIG. 8, the carrier arm 52 includes a tubular arm member 208 through which the rotatable connector 128 extends. Tubular arm member 208 has opposite ends 210 and 212 respectively located adjacent the horizontal pivotal axis A and adjacent the dispensing head 60. These arm member ends 210 and 212 include associated antifriction bearings 214 and 216 that respectively support the reduced diameter upper and lower ends 126 and 218 of the rotatable connector 128 about axis E for the rotation that moves the label carriers between the retracted and extended positions.

With reference to FIG. 10, the drivetrain 198 that interconnects the label carriers 62 includes lost motion camming connections 220 between the camming arms 196 and 206 and the associated label carriers 62. Each connection 220 includes a slot 222 on the associated camming arm 196 or 206. A pin 224 of each camming connection 220 is mounted on the associated label carrier and is received within the associated camming arm slot 222. Pivoting of the camming arms 196 and 206 toward and away from each other about their associated axes E and H as provided by the intermeshed gears 200 and 202 simultaneously moves both label carriers 62 in retracting or extending directions as previously described as the pins 224 slide within the slots 222 in a lost motion manner.

Figure 11:
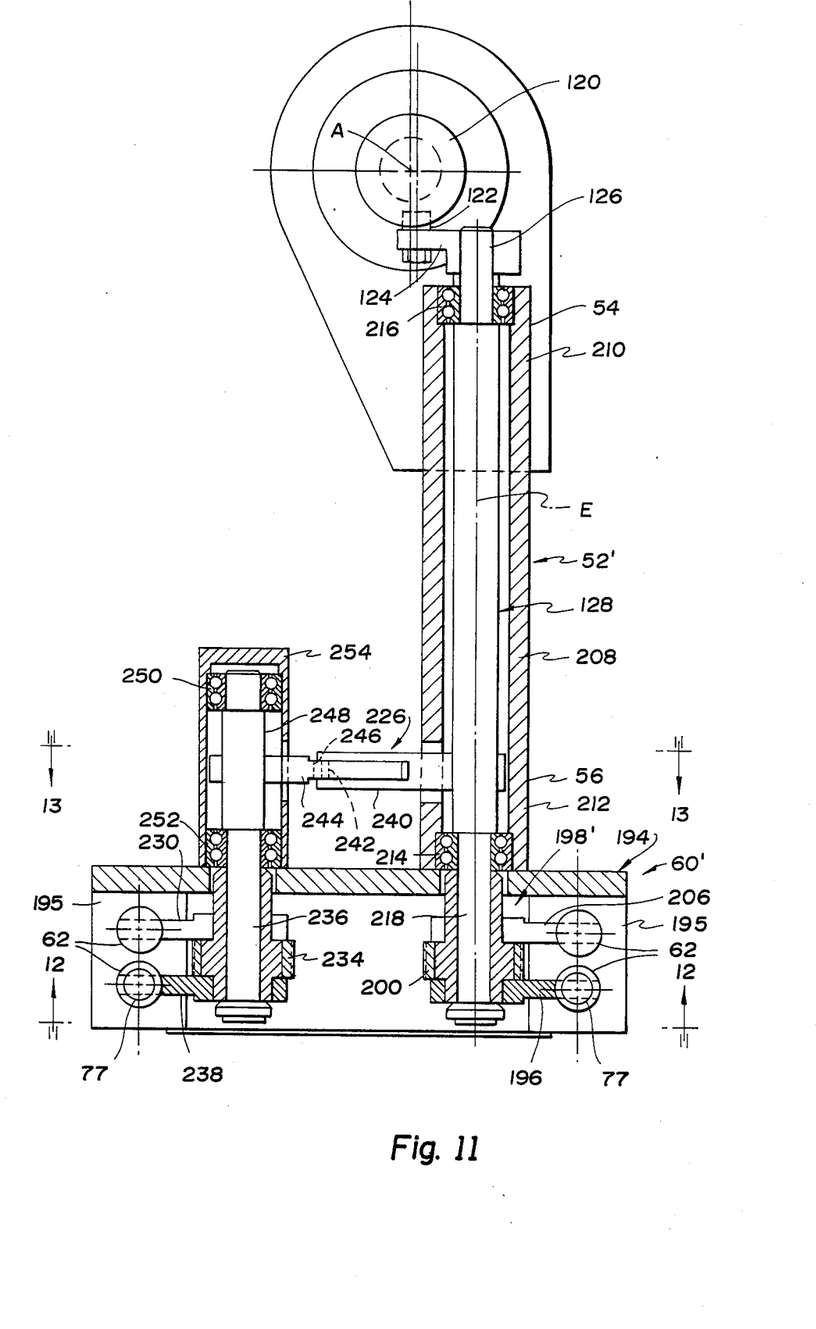
FIGS. 11 and 12 are respectively views similar to FIGS. 8 and 10 illustrating a modified embodiment of the carrier arm wherein the dispensing head thereof supports two pairs of label carriers for providing an in-mold labeling operation of a dual cavity mold.
Figure 12:
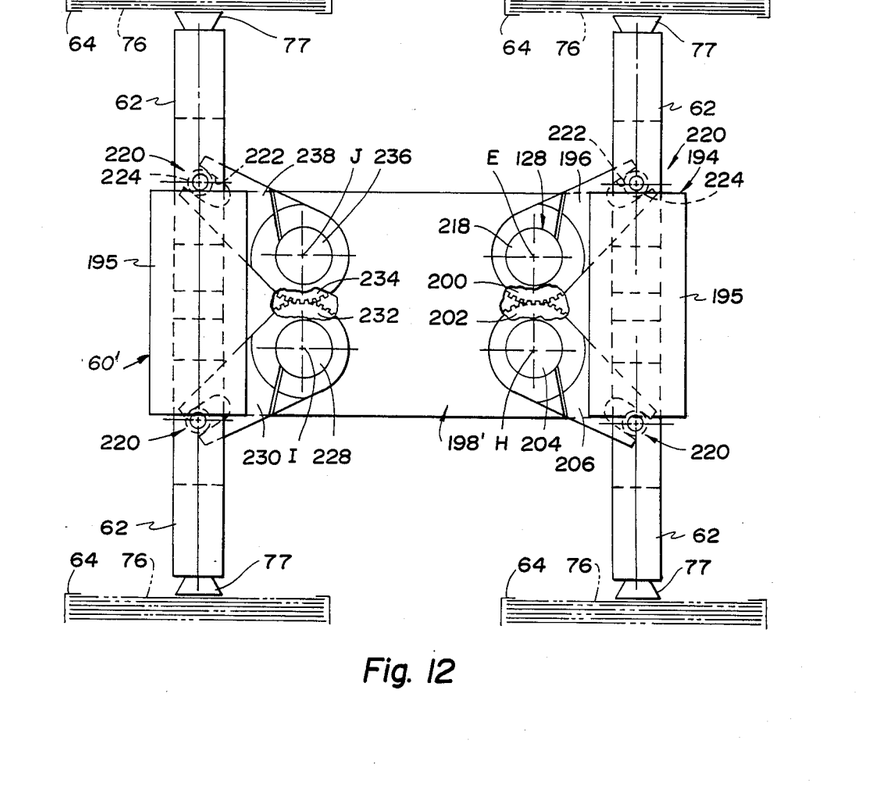

Referring now to FIG. 11, the modified embodiment 52' of the carrier arm is of the same construction as the previously described embodiment except for its dispensing head 60' which includes two pairs of the label carriers 62 for supplying labels to multiple cavity mold sections during the in-mold labeling operation. Normally there will two pairs of label magazines 64 as shown in FIG. 12 such that all of the labels are secured to the associated label carriers at one time upon movement of the label carriers to the extended positions to secure labels. However, it is also possible to utilize only one pair of the label magazines, and to move the carrier arm in a hesitating manner as each pair of label carriers is aligned with the single stacks of labels in the label magazines and then moved to the extended positions to secure labels.

Figure 13:
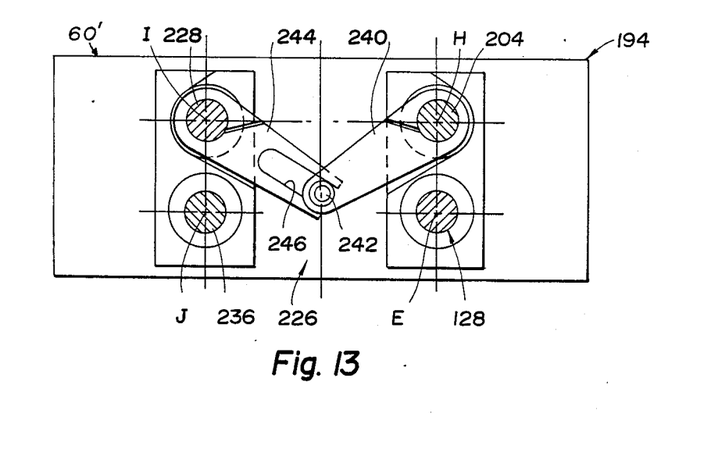
FIG. 13 is a top plan view taken along the direction of line 13—13 in FIG. 11 to illustrate a lost motion camming connection that interconnects the two pairs of label carriers with each other.

As illustrated in FIGS. 11 and 12, the drivetrain 198' for the right pair of label carriers 62 has a construction similar to the previously described embodiment except for the orientation of the camming arms 196 and 206 which extend toward the right from their pivotal axis E and H instead of toward the left. Otherwise, the construction and operation of a right pair of label carriers is the same as the previously described embodiment. Just above the housing 194 of the dispensing head 60', a lost motion camming connection 226 of the drivetrain 198' connects the shaft 204 to another shaft 228 that is rotatable about an axis I as shown in FIGS. 12 and 13. Shaft 228 is rotatably fixed to a camming arm 230 which, as shown in FIG. 12, drives the associated label carrier 62 through a lost motion camming connection 220. A gear 232 on the shaft 228 is meshed with another gear 234 on a shaft 236 which is rotatable about an associated axis J and rotatably fixed to a camming arm 238 that has a lost motion camming connection 220 to the asociated label carrier 62.

As best illustrated in FIG. 13, the connection 220 includes a camming arm 240 rotatively fixed to the associated shaft 204 and having a pin 242 on its distal end. Another camming arm 244 of the connection 226 is rotatively fixed on the associated shaft 228 and has an elongated slot 246 that receives the pin 242 on the other camming arm 240 of the connection. Rotation of the shaft 204 by the geared connection thereof with the connector 128 thus rotates the camming arm 240 and thorugh the pin 242 and slot 246 rotates the camming arm 244 to rotate shaft 228 which in turn through its gear connection rotates the other shaft 236. The connection and gearing of the shafts 204, 228, and 236 with respect to the rotatable connector 128 is designed to provide simultaneous extension of all of the label carriers 62 and retraction thereof as the connector 128 is rotated by the second drive mechanism in the manner previously described in connection with the first embodiment of the carrier arm.

Each of the shafts 204, 228, and 236 illustrated in FIGS. 12 and 13 is rotatably mounted as illustrated by the one shaft 236 shown in FIG. 11 wherein an upper end 248 of the shaft is mounted by upper and lower antifriction bearings 250 and 252 within a housing portion 254 of the dispenser housing 194. Thus, the lost motion connection 226 between the right and left pairs of label carriers extends between the upper ends of the two shafts 204 and 228 at a location between the associated upper and lower bearings that support the shafts on the housing as illustrated in FIG. 11.

Figure 14:
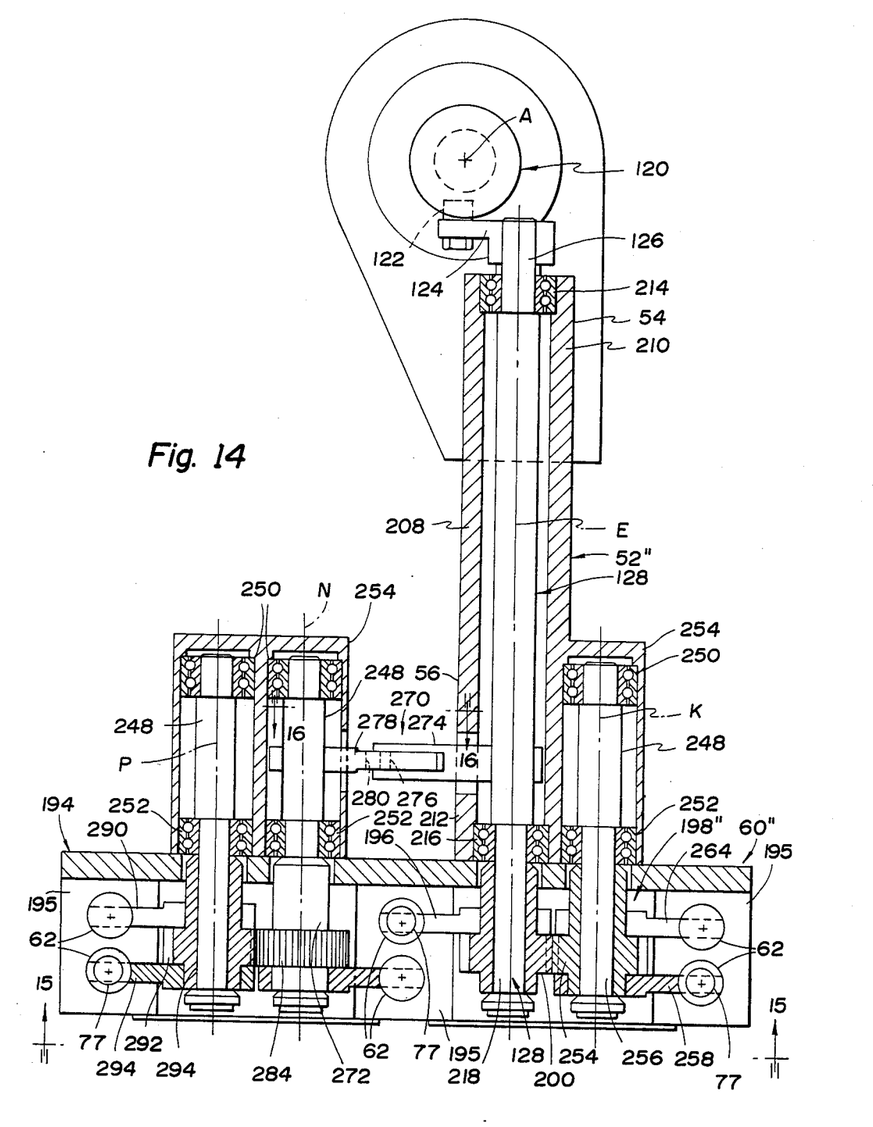
FIGS. 14, 15, and 16 are views respectively similar to FIGS. 11, 12, and 13 of another modified embodiment of the carrier arm wherein the dispensing head supports three pairs of label carriers for providing an in-mold labeling operation of a three cavity mold.
Figure 15:
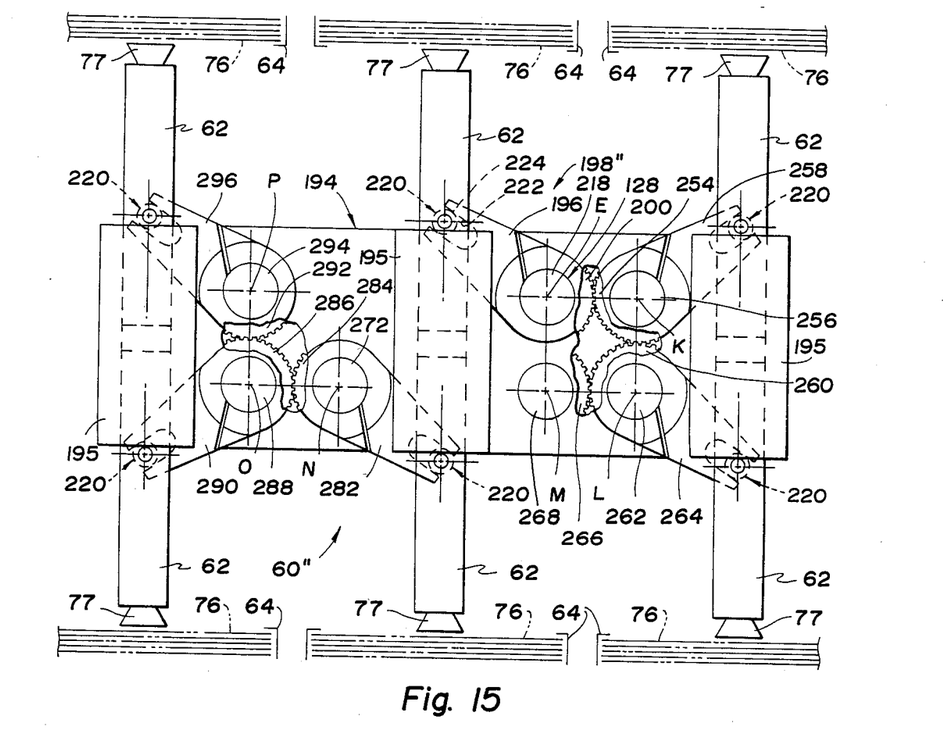

With reference to FIG. 14, a further embodiment of the carrier arm 52″ is illustrated as including three pairs of label carriers on its dispensing head 60″. Drivetrain 198″ of the dispensing head 60″ includes a camming arm 196 that is rotatively fixed to the rotatable connector 128 at its lower end 218 for rotation about axis E. Camming arm 196 is connected by one of the lost motion camming connections 220 to one of the center label carriers 62. Gear 200 is rotatively fixed to the rotatable connector 128 at its lower end 218 and, as also shown in FIG. 15, is meshed with a gear 254 on a shaft 256 that is rotatable about an axis K. A camming arm 258 is rotatively secured to shaft 256 and has a lost motion camming connection 220 with one of the right label carriers 62 to provide the retracting and extending movement thereof by pivoting upon rotation of shaft 256 about axis K by the driving action of the intermeshed gears 200 and 256 as the rotatable connector 128 is driven about its axis E. Gear 254 is also meshed as shown in FIG. 15 with a gear 260 on a shaft 262 that is rotatable about an axis L. A camming arm 264 is rotatively fixed to the shaft 262 and has a lost motion camming connection 220 to the other right label carrier 62 so as to provide coordinated extending and retracting movement thereof with the right label carrier 62 driven by the camming arm 258 and with the center label carrier 62 driven by the camming arm 196. Gear 260 is also meshed with a gear 266 mounted on a shaft 268 that is rotatable about an axis M to provide interconnection of the label carriers 62 driven by the camming arms 196, 258, and 264 with the other three label carriers.

Figure 16:
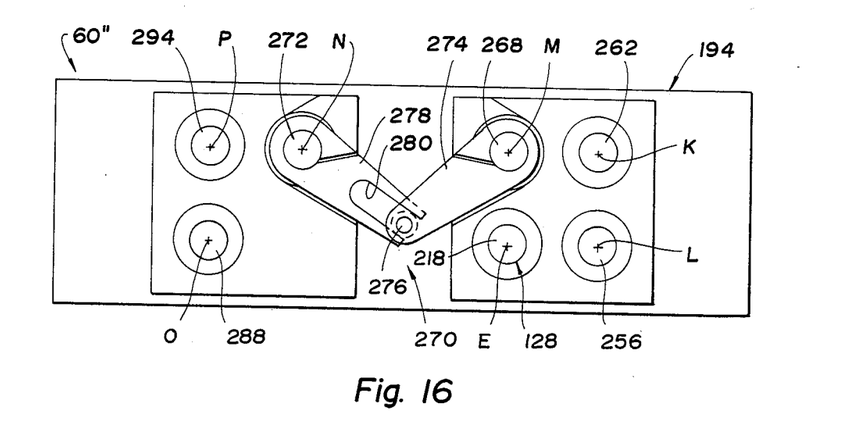

As illustrated in FIG. 16, a lost motion camming connection 270 of the dispensing head drivetrain connects the shaft 268 with another shaft 272 that is rotatable about an axis N to interconnect the label carriers whose driving operation has previously been described with the other label carriers. The lost motion camming connection 270 includes a camming arm 274 that is rotatably driven by the shaft 268 and has a pin 276 on its distal end. A camming arm 278 of the connection 270 is rotatably fixed on the shaft 272 and has an elongated slot 280 that receives the pin 276 on the camming arm 274. Rotation of the shaft 268 about axis M pivots the camming arm 274 and through the pin 276 and slot 280 pivots the camming arm 278 to rotate the shaft 272 about axis N.

As illustrated in FIG. 15, a camming arm 282 is rotatably fixed to the shaft 272 and has a lost motion camming connection 220 with the center label carrier 62 opposite the other center label carrier 62 driven by the camming arm 196. A gear 284 rotatively fixed to the shaft 272 is meshed as shown in FIG. 15 with a gear 286 on a shaft 288 that is rotatably supported about an axis O. A camming arm 290 is rotatively driven with the shaft 288 and has a lost motion camming connection 220 to one of the left label carriers 62 to provide retracting and extending movement thereof upon rotation of the shaft 288 in coordination with the label carrier 62 driven by the camming arm 282 and the other interconnected label carriers as previously described. Gear 286 is also meshed with a gear 292 on a shaft 294 that is rotatably supported about an axis P. A camming arm 296 rotatively fixed to the shaft 294 has a lost motion camming connection 220 to the other left label carrier 62 to provide coordinated retracting and extending movement thereof with the other label carriers.

The carrier arms 52′ and 52″ described above with multiple pairs of label carriers 62 can be utilized with a corresponding number of pairs of associated label magazines to simultaneously supply labels thereto upon extending or retracting movement of the label carriers. Alternatively, it is possible to utilize one pair of label magazines that sequentially supply labels to each aligned pair of label carriers as the dispensing head 60′ or 60″ is moved in a swinging and hesitating manner that momentarily aligns each pair of label carriers 62 with the single pair of label magazines to permit the extending and retracting label carrier movement that initially secures the labels to the label carriers in the manner previously described. Likewise, if only one label is to be applied to each cavity of a multiple cavity mold, only one label magazine can be utilized to supply the labels to the label carriers of the dispensing head.

While the best modes for carrying out the invention have been described in detail, those familiar with the art to which this invention relates will recognize various alternative ways of practicing the invention as defined by the following claims.

What is claimed is:

1. An in-mold label dispenser for a plastic blow molding machine including a rotary wheel having mold including mold sections movable between open and closed positions, the in-mold label dispenser comprising: a base; a carrier arm having first and second ends; a support that pivotally mounts the first end of the carrier arm on the base for movement about a pivotal axis between withdrawn and inserted positions with respect to mold sections of an adjacent open mold; a dispensing head fixedly mounted on the second end of the carrier arm for swinging movement along a curved path and being located between open mold sections with the carrier arm in the inserted position; at least one label carrier mounted on the dispensing head for movement between retracted and extended positions; at least one label magazine located adjacent the dispensing head with the carrier arm in the withdrawn position; and a drive mechanism including a first drive that pivotally moves the carrier arm between the withdrawn and inserted positions and a second drive that moves the label carrier between the retracted and extended positions during cyclical operation that transfers labels from the label magazine to the molds.

2. An in-mold label dispenser as in claim 1 wherein the drive mechanism includes an input driven in coordination with the rotary wheel of the blow molding machine with which the label dispenser is used, and the input of the drive mechanism driving the first and second drive thereof in coordination with the rotary wheel and with each other.

3. An in-mold label dispenser as in claim 1 further including a detachable connection for detachably securing the carrier arm to the support.

4. An in-mold label dispenser as in claim 1 wherein the second drive mechanism includes an adjuster for controlling the extent of movement of the label carrier between the retracted and extended positions.

5. An in-mold label dispenser as in claim 1 wherein the support mounts the carrier arm for pivotal movement about a horizontal axis between the inserted and withdrawn positions.

6. An in-mold label dispenser as in claim 5 wherein the support includes a horizontally extending support tube that extends along the horizontal axis, the support tube having a first end rotatably mounted on the base about the horizontal axis, and the support tube having a second end that supports the carrier arm for the pivotal movement between the withdrawn and inserted positions upon rotation of the support tube.

7. An in-mold label dispenser as in claim 6 wherein the first drive includes a first drive unit mounted on the base and having an input as well as a rotatable output that supports the first end of the support tube, the second drive including a second drive unit mounted on the base and having an input as well as as output that extends through the support tube to move the label carrier on the dispensing head on the carrier arm, and the drive mechanism including an input that drives the inputs of both the first and second drive units in coordination with each other and with the rotary wheel of the blow molding machine with which the label dispenser is used.

8. An in-mold label dispenser as in claim 7 wherein the input of the drive mechanism includes a pair of pulleys and a continuous belt that interconnect the inputs of the first and second drive units.

9. An in-mold label dispenser as in claim 8 further including an adjustable tensioner for controlling the tension of the belt.

10. An in-mold label dispenser as in claim 7 wherein the output of the second drive unit comprises a plunger that extends through the support tube and is moved axially along the horizontal axis about which the support tube is rotated by the first drive unit, and a cam and follower that connect the plunger and the label carrier to provide movement thereof between the retracted and extended positions by axial movement of the plunger within the support tube.

11. An in-mold label dispenser as in claim 10 wherein the cam is mounted on the plunger, the carrier arm including a rotatable connector that moves the label carrier between the retracted and extended positions, and the follower being mounted on the rotatable connector and engaged with the cam on the plunger to move the label carrier by the plunger movement.

12. An in-mold label carrier as in claim 11 wherein the cam includes a pair of spaced flanges between which the follower is received.

13. An in-mold label dispenser as in claim 10 wherein the second drive unit includes an adjuster that controls the extent of axial movement of the plunger to thereby control the extent of movement of the label carrier between the retracted and extended positions.

14. An in-mold label dispenser as in claim 11 wherein the adjuster includes an eccentric that is rotated by the second drive unit and connected to the plunger to provide the axial movement of the plunger, and the adjuster also including at least one adjustment member for controlling the eccentricity of the eccentric and the extent of axial movement of the plunger.

15. An in-mold label dispenser as in claim 7 or 11 further including an adjustable mount that adjustably positions the first and second drive units of the drive mechanism and hence the support tube and the carrier arm on the base.

16. An in-mold label dispenser as in claim 15 wherein the adjustable mount includes a plate that supports the first and second drive units, and vertically adjustable connections that secure the plate to the base to permit vertical adjustment of the dispensing head of the carrier arm and hence the vertical location at which the labels are supplied to the molds.

17. An in-mold label dispenser as in claim 16 further including an adjusting bolt that moves the plate vertically on the base to provide the adjustment of the vertical location at which the labels are supplied to molds.

18. An in-mold label dispenser as in claim 1, 6, 7, or 11 wherein the dispensing head includes a plurality of label carriers, the carrier arm including a rotatable connector that is rotated by the second drive and connected to one label carrier to provide movement thereof between the retracted and extended positions, and a drivetrain that connects said one label carrier with each other label carrier to provide the retracting and extending movement thereof upon rotation of the connector by the second drive of the drive mechanism.

19. An in-mold label dispenser as in claim 18 wherein the carrier arm comprises a tubular arm member through which the rotatable connector extends, and said tubular arm member having opposite ends including bearings that support the connector for rotation that moves the label carriers between the retracted and extended positions.

20. An in-mold label dispenser as in claim 19 wherein the drivetrain that connects the label carriers includes gears and lost motion camming connections for moving the label carriers between the retracted and extended positions by the rotation of the connector.

21. An in-mold label dispenser for a plastic blow molding machine including a rotary wheel having molds including mold sections movable between open and closed positions, the in-mold label dispenser comprising: a base; a carrier arm having first and second ends; a support including a horizontally extending support tube that pivotally mounts the first end of the carrier arm on the base for movement about a horizontal pivotal axis between withdrawn and inserted positions with respect to mold sections of an adjacent open mold; a dispensing head fixedly mounted on the second end of the carrier arm for swinging movement along a curved path and being located between open mold sections with the carrier arm in the inserted position; at least one label carrier mounted on the dispensing head for movement between retracted and extended positions; at least one label magazine located adjacent the dispensing head with the carrier arm in the withdrawn position; and a drive mechanism including a first drive that rotates the support tube to pivotally move the carrier arm about the horizontal pivotal axis between the withdrawn and inserted positions, the drive mechanism also including a second drive that extends through the support tube and moves the label carrier between the retracted and extended positions, and the drive mechanism including an input driven in coordination with the rotary wheel of the associated blow molding machine and connected to the first and second drives to provide coordinated driving thereof during cyclical operation that transfers labels from the label magazine to the molds.

22. An in-mold label dispenser for a plastic blow molding machine including a rotary wheel having molds including mold sections movable between open and closed positions, the in-mold label dispenser comprising: a base; a carrier arm having first and second ends; a support including a horizontally extending support tube mounted on the base for movement about a horizontal pivotal axis; a detachable connection that secures the first end of the carrier arm to the support tube for movement between withdrawn and inserted positions with respect to mold sections of an adjacent open mold as the support tube is rotated about the horizontal pivotal axis; a dispensing head fixedly mounted on the second end of the carrier arm for swinging movement along a curved path and being located between open mold sections with the carrier arm in the inserted position; at least one label carrier mounted on the dispensing head for movement between retracted and extended positions; at least one label magazine located adjacent the dispensing head with the carrier arm in the withdrawn position; and a drive mechanism including a first drive that rotates the support tube to pivotally move the carrier arm about the horizontal pivotal axis between the withdrawn and inserted positions, the drive mechanism also including a second drive that extends through the support tube and moves the label carrier between the retracted and extended positions, and the drive mechanism including an input driven in coordination with the rotary wheel of the associated blow molding machine and connected to the first and second drives to provide coordinated driving thereof during cyclical operation that transfers labels from the label magazine to the molds.

23. An in-mold label dispenser for a plastic blow molding machine including a rotary wheel having molds including mold sections movable between open and closed positions, the in-mold label dispenser comprising: a base; a carrier arm having first and second ends; a support including a horizontally extending support tube that pivotally mounts the first end of the carrier arm on the base for movement about a horizontal pivotal axis between withdrawn and inserted positions with respect to mold sections of an adjacent open mold; a dispensing head fixedly mounted on the second end of the carrier arm for swinging movement along a curved path and being located between open mold sections with the carrier arm in the inserted positions; a plurality of label carriers mounted on the dispensing head for movement between retracted and extended positions; a plurality of label magazines located adjacent the dispensing head with the carrier arm in the withdrawn position; and a drive mechanism including a first drive that rotates the support tube to pivotally move the carrier arm about the horizontal pivotal axis between the withdrawn and inserted positions, the drive mechanism also including a second drive that extends through the support tube and moves the label carriers between the retracted and extended positions, and the drive mechanism including an input driven in coordination with the rotary wheel of the associated blow molding machine and connected to the first and second drives to provide coordinated driving thereof during cyclical operation that transfers labels from the label magazines to the molds.

24. An in-mold label dispenser for a plastic blow molding machine including a rotary wheel having molds including mold sections movable between open and closed positions, the in-mold label dispenser comprising: a base; a carrier arm including a tubular arm member having first and second ends; the carrier arm also including a rotatable connector extending through the tubular arm member; a support including a horizontally extending support tube that pivotally mounts the first end of the carrier arm member on the base for movement of the carrier arm about a horizontal pivotal axis between withdrawn and inserted positions with respect to mold sections of an adjacent open mold; a dispensing head fixedly mounted on the second end of the carrier arm member for swinging movement along a curved path and being located between open mold sections with the carrier arm in the inserted position; at least one label carrier mounted on the dispensing head for movement between retracted and extended positions upon rotation of the connector of the carrier arm; at least one label magazine located adjacent the dispensing head with the carrier arm in the withdrawn position; and a drive mechanism including a first drive that rotates the support tube to pivotally move the carrier arm about the horizontal pivotal axis between the withdrawn and inserted positions, the drive mechanism also including a second drive having a plunger that extends through the support tube and is connected to the rotatable connector of the carrier arm to move the label carrier between the retracted and extended positions, and the drive mechanism including an input driven in coordination with the rotary wheel of the associated blow molding machine and connected to the first and second drives to provide coordinated driving thereof during cyclical operation that transfers labels from the label magazines to the molds.

25. An in-mold label dispenser for a plastic blow molding machine including a rotary wheel having molds including mold sections movable between open and closed positions, the in-mold label dispenser comprising: a base; a carrier arm including a tubular arm member having first and second ends; the carrier arm also including a rotatable connector extending through the tubular arm member; a cam and follower for rotating the connector of the carrier arm; a support including a horizontally extending support tube that pivotally mounts the first end of the carrier arm member on the base for movememt of the carrier arm about a horizontal pivotal axis between withdrawn and inserted positions with respect to mold sections of an adjacent open mold; a dispensing head fixedly mounted on the second end of the carrier arm member for swinging movement along a curved path and being located between open mold sections with the carrier arm in the inserted position; a plurality of label carriers mounted on the dispensing head for movement between retracted and extended positions; a drivetrain for moving the label carriers between the retracted and extended positions upon rotation of the connector of the carrier arm; a plurality of label magazines located adjacent the dispensing head with the carrier arm in the withdrawn position; and a drive mechanism including a first drive having a first drive unit that rotates the support tube to pivotally move the carrier arm about the horizontal pivotal axis between the withdrawn and inserted positions, the drive mechanism also including a second drive having a second drive unit and a plunger that is moved by the second drive unit and extends through the support tube to operate the cam and follower and rotate the connector to the carrier arm and thereby move the label carriers between the retracted and extended positions, and the drive mechanism including an input driven in coordination with the rotary wheel of the associated blow molding machine and connected to the first and second drives to provide coordinated driving thereof during cyclical operation that transfers labels from the label magazines to the molds.

* * * * *

UNITED STATES PATENT AND TRADEMARK OFFICE
CERTIFICATE OF CORRECTION

PATENT NO. : 4,582,474

DATED : April 15, 1986

INVENTOR(S) : William E. Ziegler

It is certified that error appears in the above-identified patent and that said Letters Patent is hereby corrected as shown below:

Column 5, line 4                                                "preferablyu"
should be --preferably--; Column 7, line 49
                "rmeoved" should be --removed--; Column 9,
line 9                                  , "pivotiing" should be
--pivoting--; Column 10, line 26
"14" should be --140--; Column 12, line 66
                "thorugh" should be --through--; and
Column 14, line 42, claim 1
claim 1), "mold" should be --molds--.

Signed and Sealed this

Twenty-ninth Day of July 1986

[SEAL]

Attest:

Attesting Officer

DONALD J. QUIGG

Commissioner of Patents and Trademarks